(12) United States Patent
Boncelet, Jr. et al.

(10) Patent No.: US 6,557,103 B1
(45) Date of Patent: Apr. 29, 2003

(54) SPREAD SPECTRUM IMAGE STEGANOGRAPHY

(75) Inventors: Charles G. Boncelet, Jr., Newark, DE (US); Lisa M. Marvel, Churchville, MD (US); Charles T. Retter, Belcamp, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/257,136

(22) Filed: Feb. 11, 1999

Related U.S. Application Data

(60) Provisional application No. 60/082,635, filed on Apr. 13, 1998.

(51) Int. Cl.$^7$ ................................................ G06F 11/30

(52) U.S. Cl. ..................... 713/176; 713/165; 713/181; 713/200; 713/201

(58) Field of Search ................................ 713/165, 181, 713/200, 201, 176

(56) References Cited

U.S. PATENT DOCUMENTS

| | | |
|---|---|---|
| 5,636,292 A | 6/1997 | Rhoads |
| 5,687,236 A | 11/1997 | Moskowitz et al. |
| 5,710,834 A | 1/1998 | Rhoads |
| 5,745,569 A | 4/1998 | Moskowitz et al. |
| 5,745,604 A | 4/1998 | Rhoads |
| 5,748,763 A | 5/1998 | Rhoads |
| 5,748,783 A | 5/1998 | Rhoads |
| 5,768,426 A | 6/1998 | Rhoads |
| 5,822,432 A | 10/1998 | Moskowitz et al. |
| 5,822,436 A | 10/1998 | Rhoads |
| 5,832,119 A | 11/1998 | Rhoads |
| 5,841,886 A | 11/1998 | Rhaods |

OTHER PUBLICATIONS

Schneier, Applied Cryptography, 1995, second edition, secs. 1.2, 8.4–8.6, 8.10, 9.12).*
D. Kahn, The Code breakers—The story of secret writing. Scribner, New York, NY, 1967.
B. Pfitzmann, Trials of Traced Traitors. In R. Anderson, editor, Information Hiding, First International Workshop. Lecture Notes in Computer Science, pp. 49–64. Spriknger–Verlag, Berlin, 1996.
C. Osborne R. Van Schyndel, A Tirkel. A digital watermark. Proceedings of the IEEE International Conference on Image Processing 2:86–90, 1994.
R Machado. Stego, http://www.fqa.com/romana/romana-soft/stego.html.
R.B. Wolfgang and E.J.Delp. A watermark for digital images. Proceedings of the IEEE International Conference on Image Processing, Lausanne, Switzerland, III:219–222, Sep. 1996.

(List continued on next page.)

*Primary Examiner*—Thomas R. Peeso
(74) *Attorney, Agent, or Firm*—Mark Kelly; William W. Randolph

(57) ABSTRACT

The Spread Spectrum Image Steganography (SSIS) of the present invention is a data hiding/secret communication steganographic system which uses digital imagery as a cover signal. SSIS provides the ability to hide a significant quantity of information bits within digital images while avoiding detection by an observer. The message is recovered with low error probability due the use of error control coding. SSIS payload is, at a minimum, an order of magnitude greater than of existing watermarking methods. Furthermore, the original image is not needed to extract the hidden information. The proposed recipient need only possess a key in order to reveal the secret message. The very existence of the hidden information is virtually undetectable by human or computer analysis. Finally, SSIS provides resiliency to transmission noise, like that found in a wireless environment and low levels of compression.

15 Claims, 5 Drawing Sheets

OTHER PUBLICATIONS

E. Milbrandt. Http://members.iquest.net/~mrmil/stego.html, Oct. 1997. Steganography Info and Archive.

T. Leighton, I.J. Cox, J. Kilian and T. Shamoon. Secure Spread Spectrum Watermarking for Images, Audio and Video. Proceedings of the IEEE International Conference on Image Processing, Lansanne, Switzerland, III:243–246, Sep. 1996.

C.I. Podilchuk and W. Zeng. Digital Image Watermarking Using Visual Models. In B.E. Rogowitz and T.N. Pappas, editors, Human Vision and Electronic Imaging II. vol. 3016, pp. 100–111. SPIE , Feb. 1997.

B. Zhu, M.D. Swanson and A.H. Tewfik. Transparent Robust Image Watermarking. Proceedings of the IEEE International Conference on Image Processing, Lansanne, Switzerland, III:211–214, Sep. 1996.

N. Moirimoto, W. Bender, D. Gruhl and A. Lu. Techniques for Data Hiding. IBM Systems Journal 35 (3&4), 1996.

B. Zhu, M.D. Swanson and A.H. Twfik. Robust Data Hiding for Images. Proceeding sof the IEEE Digital Sinal Processing Workshop, Loen, Norway, pp. 37–40, Sep. 1996.

M.D. Swanson and A.h. Twfik. Data Hiding for Multimedia Personalization, Interaction, and Protection. IEEE Signal Processing Magazine, 14(4);41–44, Jul. 1997.

Y. Nakamura K. Tanaka and K. Matsui. Embedding Secret Information into a Dithered Multilevel Image. Proceedings of the IEEE military Communications Conference, Monterey, CA, pp. 216–220, 1990.

E. Adelson, Digital Signal Encoding and Decoding Apparatus. U.S. patent 4,939,515, 1990.

G.B. Rhoads. Steganography Method Employing Embedded Calibration Data. U.S. Patent 5,636,292, 1997.

M. Coopeerman. Steganographic Method and Device. U.S. Patent 5,613,004, 1997.

A,K.Jain Fundamentals of Digital Image Processing. Prentice–Hall, Inc., Englewood Cliffs, NJ 1989.

R.A. Scholtz, M.K. Simon, J.K. Omura and B.K. Levitt. Spread Spectrum Communications, vol. L Computer Science Press, Rockville, Maryland 1985.

B. Schneier. Applied Cryptography—Protocols, Algorithms, and Source Code in C. John Wiley and Sons, Inc. New York, NY 1996.

F. Hartung and B. Girod. Fast Public Key Watermarking of Compressed Video. Proceedings of the IEEE International Conference on Image Processing, Santa Barbara CA Oct. 1997.

M. Abramowitz and I.A. Stegun. Handbook of Mathematical Functions with Formulas, Graphs, and Mathematical Tables. Dover Publications, Inc., New York, NY 1964.

D.L. Donoho. De–noising by Soft–thresdholding IEEE Transactions on Information Theory, 41(3):613–627, 1995.

J.S. Lim. Two–Dimensional Signal and Image Processing. Prentice–Hall, Inc., Englewood Cliffs, NJ 1990.

J.S.Lee. Digital Image Enhancement and Noise Filtering by Use of Local Statistics. IEEE Transactions on Pattern Analysis and Machine Intelligence, 2:165–168, Mar. 1980.

C.T. Retter. Decoding Binary Expansions of Low–rate Reed–Solomon Codes Far Beyond the BCH Bound. Proceedings of the 1995 IEEE International Symposium on Information Theory, Whistler, British Columbia, p. 276, Sep. 1995.

M. Bossert and F. Hergert. Hard–and–Soft–Decision Decoding Beyond the Half Minimum Distance–an Algorithm for Linear codes. IEEE Transactions on Information Theory, 32(5):709–714, Sep. 1986.

J. Bee Bednar and Terry L. Watt. Alpha–Trimmed Means and Their Relationship to Median Filters. IEEE Transactions on Acoustics, Speech and Signal Processing, vol. ASSP–32 No. 1, pp. 145–153, Feb. 1984.

L.J. Harcke and G.E. Wood. Laboratory and Flight Performance of the Mars Pathfinder (15,1/6) Convolutionally Encoded Telemetry Link. National Aeronautics and Space Administration (NASA), NASA/JPL TDA Progress Report 42–129, NASA Code 624–04–00MN–20, May 1997.

A. J. Viterbi, Error Bounds for Convolutional Codes and an Asymptotically Optimum Decoding Algorithm, IEEE, Transactions on Information Theory, Apr. 1967, vol. 1T–13 No. 2, pp. 260–269.

* cited by examiner

SPREAD SPECTRUM IMAGE STEGANOGRAPHY

CLAIM TO PRIORITY

Applicants claim domestic priority under 35 U.S.C. §119 (e) based on provisional application serial No. 60/082635 filed on Apr. 13, 1998.

BACKGROUND OF THE INVENTION

1. Introduction

The present invention relates generally to the field of digital image steganography and is more particularly directed to a new system of steganography referred to herein as Spread Spectrum Image Steganography (SSIS). Steganography, meaning "covered writing" in Greek, is the science of communicating in a manner such that the existence of the communication is hidden. The SSIS system hides and recovers a message of substantial length within digital imagery while maintaining the original image size and dynamic range. The hidden message can be recovered using appropriate keys without any knowledge of the original image. A message embedded by the SSIS method can be in the form of text, imagery or any other digital signal. Applications for such a data hiding scheme include in-band captioning, covert communication, image tamperproofing, authentication, embedded control and revision tracking.

2. Discussion of Related Art

In this application several publications are referenced by Arabic numerals in brackets { }. Full citations for these publications may be found at the end of the written description immediately preceding the claims. The disclosures of all such publications, in their entireties, are hereby expressly incorporated by reference in this application as if fully set forth, for purposes of indicating the background of the invention and illustrating the state of the art.

Humans have been engaged in steganography for thousands of years. There are several examples of steganography from ancient Greece {1}. One of the first is from the Histories of Herodotus. In ancient Greece, text was written on wax covered tablets. In one story Demeratus wanted to notify Sparta that Xerxes intended to invade Greece. To avoid capture, he scraped the wax off of the tablets and wrote a message on the underlying wood. He then covered the tablets with wax again. The tablets appeared to be blank and unused so they passed inspection by sentries without question. Another method was to shave the head of a messenger and tattoo a message or image on the messenger's head. After allowing his or her hair to grow, the message would be undetected until the head was shaved again.

Modern times have yielded more advanced techniques, such as the use of invisible inks, where certain chemical reactions are necessary to reveal the hidden message. Common sources for invisible inks are milk, vinegar and fruit juices. All of these darken when heated. Another method employs routine correspondence—applying pin pricks in the vicinity of particular letters can spell out a secret message. As message detection improved, new technologies developed that permitted the passage of greater information that was better hidden. Advances in photography produced microfilm which was used to transmit messages via carrier pigeon. Improved film and lenses permitted reduction in the size of a full typewritten page to that of a printed period. This technique, known as the microdot, was used by the Germans in World War II.

With much of today's communications occurring electronically, digital signals increasingly are used as vehicles for steganographic communication. These signals, which typically represent audio, video or still imagery, are defined as cover signals. Schemes where the unaltered cover signal is needed to reveal the hidden information are known as cover escrow schemes. They can be useful in traitor tracing schemes such as those described in {2}. In this scenario, copies of the cover signal are disseminated with the identity of the assignee embedded within, resulting in a modified cover signal. If unauthorized copies of the signal are acquired, the source of the copy is established by subtracting the original cover data from the modified signal, thereby exposing the offender's identity. However, in many applications it is not practical to require possession of the unaltered cover signal in order to extract the hidden information. More pragmatic methods, known as blind or oblivious schemes, have the ability to reveal the embedded data from the modified signal without using the cover. Strategies such as these are predominant among steganographic schemes of the present day.

Digital steganography is currently a very active research area encompassing methods of copyright protection, image authentication, and secure communications. Several techniques are known that conceal information in the least significant bit (LSB) plane of digital images. This manipulation may take many forms, from direct replacement of the cover LSBs with message bits to some type of logical or arithmetic combination between the two, such as the "exclusive or" operation. By modifying the insignificant bits, the cover image is typically altered in a nearly imperceptible manner thereby ensuring that any observer would be unaware of the presence of the hidden information {3}. Other techniques that utilize the LSB method incorporate the alteration of color pallets for images stored in the GIF format {4} or the use of m-sequences by Wolfgang and Delp {5}. There have been numerous software programs written that apply this concept to different image formats {6}. Employing the LSB technique for data hiding achieves both invisibility and reasonably high storage payload, a maximum of one bit per pixel (bpp) for grayscale and three bpp for Red-Green-Blue (RGB) images. However, the method is vulnerable and the hidden information is subject to extraction by undesirable parties. In some cases this technique requires cover image escrow of the LSB plane for message recovery. Moreover, LSB methods are generally not resilient to noisy transmission because the subject bits must be transmitted in an error free manner for reliable message decoding.

There are, of course, many cover escrow approaches, i.e., schemes where it is necessary to possess the original cover signal in order to retrieve the hidden information. Such a method was proposed by Cox, et al. {7}, where the message is inserted into the most significant Discrete Cosine Transform (DCT) coefficients of the cover image using techniques analogous to spread spectrum, thus allowing the hidden signal to be imperceptible. Other cover escrow schemes can be found in {8} and {9}.

Several procedures for data hiding in imagery and audio can be found in {10}. One, entitled Patchwork, embeds a specific statistic within the cover image. First, pairs of image regions are selected using a pseudorandom number generator. Pseudorandom is defined as random in appearance but reproducible by deterministic means, such as a number generated by a series of equations. Once a pair is selected, the pixel intensities within one region are increased by a constant value while the pixels of the other region decreased by the same value. A texture mapping method is also described which copies areas of random textures from one area of the image to another. Simple autocorrelation of the signal is used to expose the hidden information. The payload in both of these schemes is low.

A few methods have been proposed which exploit characteristics of the human visual system to make the embedded data less perceptible. Recent research in this area was performed by Swanson, Zhu and Tewfik {11} where both spatial and frequency masking techniques are presented. This method exploits the claim that audio or visual signals may become invisible in the presence of another signal known as a masker {12}. The payload of this system is naturally cover image dependent and not quantified.

Embedding data using the statistical properties of dithered imagery was proposed by Tanaka, et al. {13}. This systems accommodates two and three kilobytes of hidden information into bilevel and three level 256×256 images, respectively.

A few patents exist in this area of research. U.S. Pat. No. 4,939,515 to Adelson suggests using a digital signal to specify the quantizer used to digitize an analog waveform. The choice of the quantizer corresponds to the hidden information. A familiar steganographic patent is U.S. Pat. No. 5,636,292 to Rhoads which uses the Digimarc watermarking scheme to hide an N-bit sequence using N pseudorandom patterns. There is of course an upper limit on N which reflects low payload. In addition, U.S. Pat. No. 5,613,004 to Cooperman discusses a concept to hide information in the frequency domain of an audio or imagery signal using a cipher technique to hide a signature. This signature is also short in length.

As has been demonstrated, all of the foregoing methods suffer from various drawbacks. What is needed is a reliable, undetectable method of digital steganography that can hide messages of significant size in cover signals while still maintaining the quality of the cover signal and without requiring prior knowledge of the original cover signal for decoding.

OBJECTS AND SUMMARY OF THE INVENTION

It is an object of this invention to provide a method of data hiding and secret communication that maximizes the amount of data successfully hidden and is capable of being decoded without prior knowledge of the original cover signal and without errors. The above and other objects are achieved, at least in part, by providing a method of steganography for concealing message within digital signals comprising encoding an input message with an error correcting code to produce an encoded message, generating a spreading sequence with a pseudorandom noise generator according to a key, modulating the encoded message by the spreading sequence to produce an embedded signal and combining the embedded signal with a cover signal to produce a stegosignal in which the input message is embedded. Preferably, the embedded signal is interleaved to enhance recovery of the embedded signal. In accordance with one aspect of the invention, interleaving is performed according to a key. In accordance with another aspect of the invention, the stegosignal is quantized to preserve the original dynamic range of the cover signal. In accordance with another aspect of the invention the low error rate control coding may comprise a binary expansion of a Reed-Solomon code. In accordance with another aspect of the invention, the input message of the SSIS system is encrypted with a key. In accordance with a preferred embodiment of the invention, the cover signal is a digital image.

In accordance with another aspect of the invention decoding of the steganographic messages embedded within digital signals include restoring the digital signal with a restoration filter to produce a restored digital signal, subtracting the restored digital signal from the digital signal to produce a difference signal, deinterleaving the difference signal according to a key, replicating a pseudorandom spreading sequence according to a key, demodulating the deinterleaved signal with the spreading sequence to construct an estimate of the message and decoding the message with an error correcting code to produce a decoded message. In accordance with another aspect of the invention, the decoder also decrypts the decoded message with a key.

DETAILED DESCRIPTION

Figure 1:
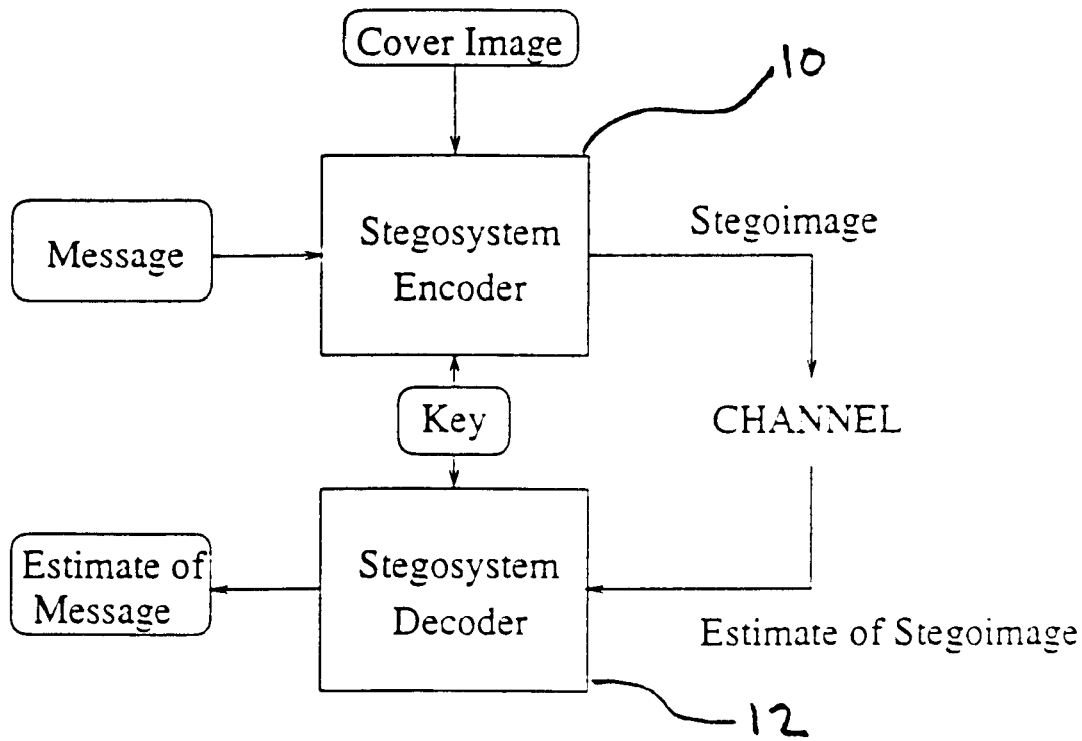
FIG. 1 shows a block schematic diagram of a stegosystem of the present invention.

A block diagram of an image steganographic system is depicted in FIG. 1. A message is embedded in a digital signal such as a signal representing a digital image, by the stegosystem encoder 10 which uses numeric keys or passwords. The resulting stegosignal, i.e., the stegoimage, is transmitted in some fashion over a channel to an intended recipient where it is processed by the stegosystem decoder 12 using the same key. During transmission the stegoimage may be monitored by viewers who will notice only the transmittal of the innocuous image without discovering the existence of the hidden message.

Figure 2:
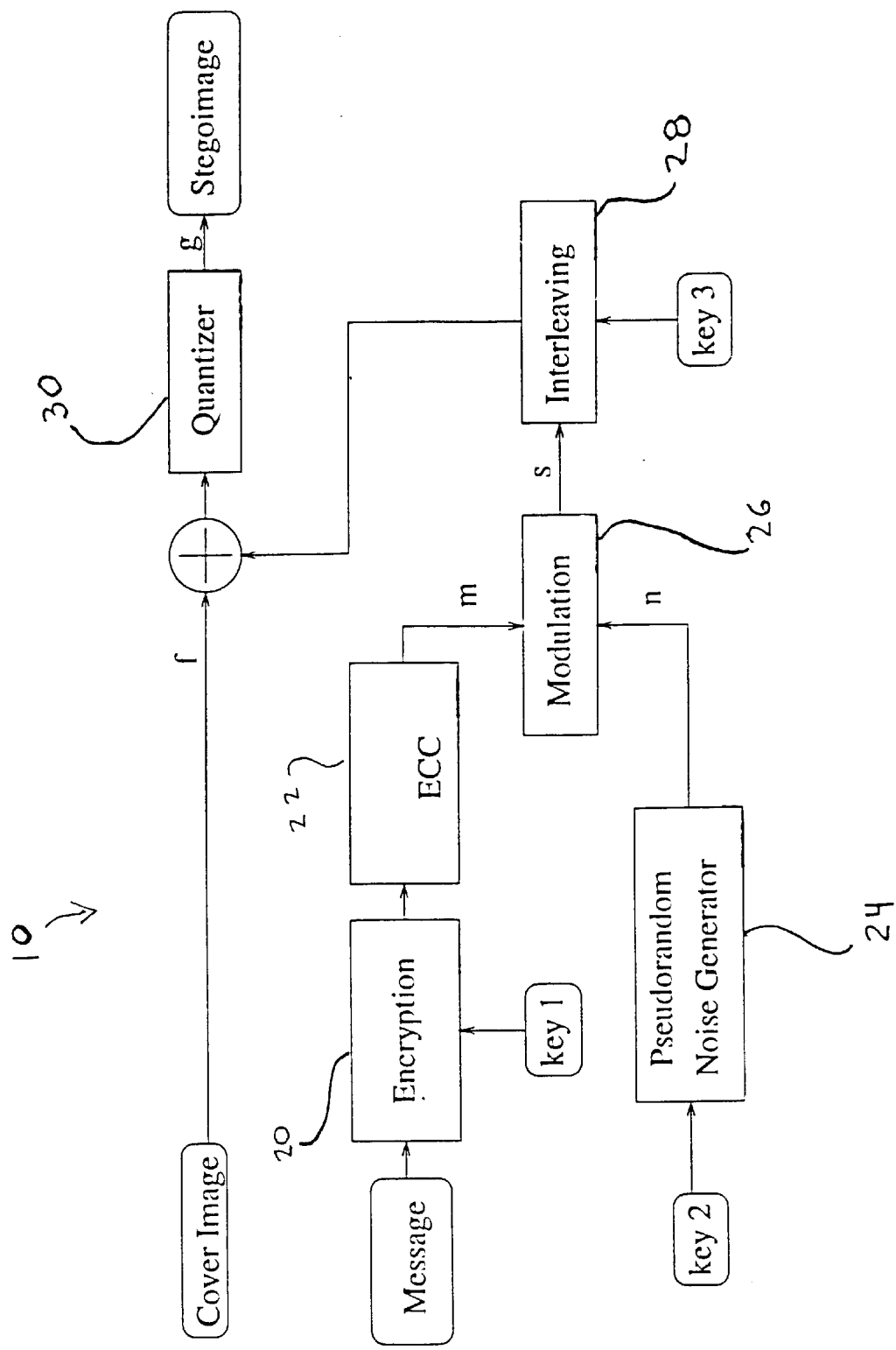
FIG. 2 shows a block schematic diagram of a steganographic encoder of the present invention.

Techniques of spread spectrum communication, error control coding, and image processing are combined to accomplish SSIS. The major processes of the stegosystem encoder 10 are portrayed in FIG. 2. The message, after optional encryption 20 with key 1, is encoded via an error correcting code 22 producing the encoded message, m. The sender enters key 2 into a wideband pseudorandom noise generator 24, generating a spreading sequence, n. Subsequently, the modulation scheme 26 is used to spread the narrowband spectrum of m with the spreading sequence n, thereby composing the embedded signal, s, which is then input into an interleaver 28. The operation of the interleaver 28 may be dictated by key 3. The interleaved signal is now combined with the cover image, to produce the stegoimage g which has been appropriately quantized by quantizer 30 to preserve the initial dynamic range of the cover image. The stegoimage is then transmitted in some manner to the recipient.

Figure 3:
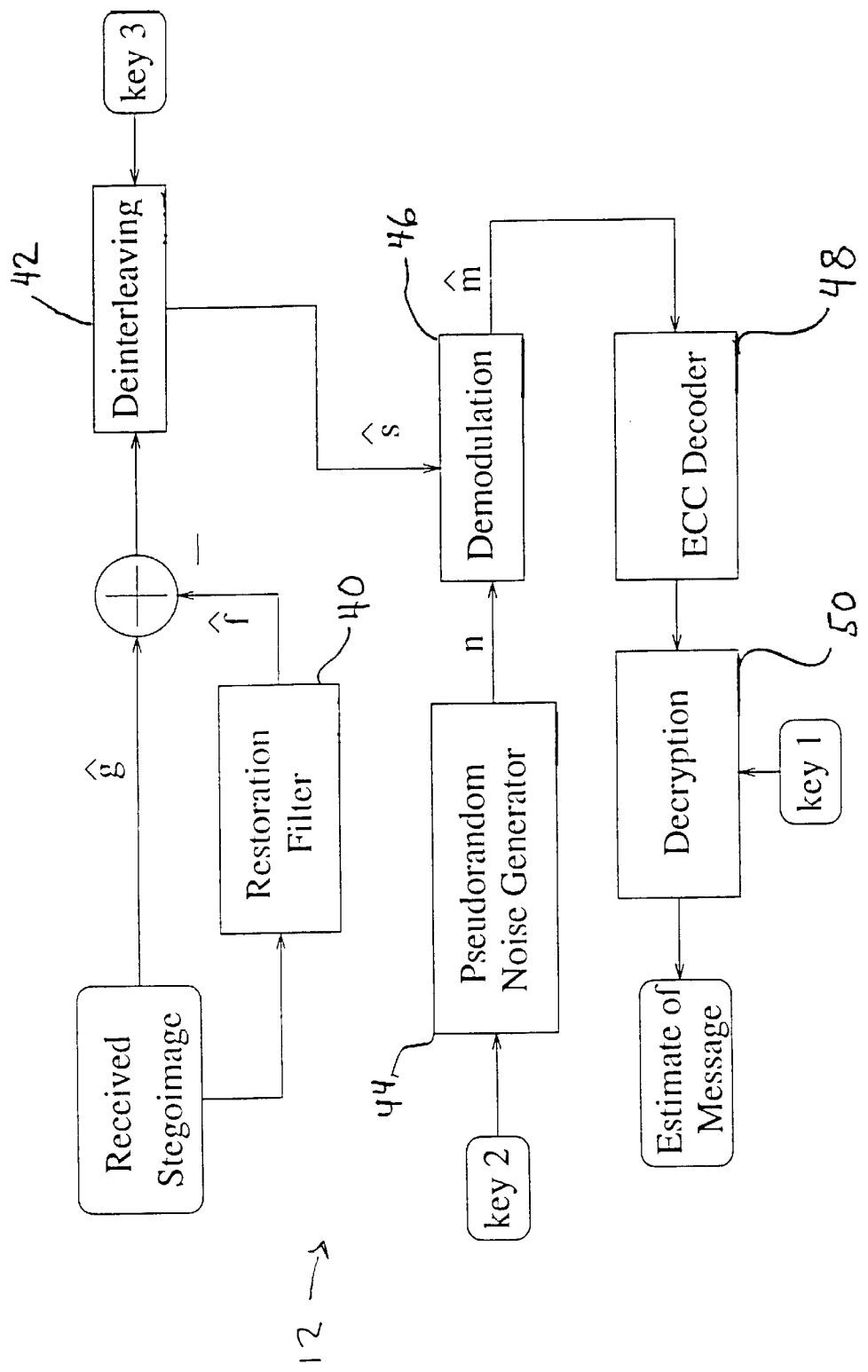
FIG. 3 shows a block schematic diagram of a steganographic decoder of the present invention.

At the receiver, the stegosystem decoder 12, shown in FIG. 3, uses an image restoration filter 40 followed by deinterleaving module 42 to construct an estimate of the embedded signal ŝ from the received stegoimage ĝ. The recipient, maintaining the same key 2 as the sender, replicates the spreading sequence n with pseudorandom noise generator 44. The encoded message is then demodulated at demodulator 46 with the spreading sequence, and an estimate of the encoded message, m̂ is constructed. The estimate of the message is then decoded via the error correcting decoder 48, optionally decrypted at decrypter 50, and revealed to the recipient.

The ability of SSIS to hide information is due to the existence of noise encountered during image acquisition. SSIS uses inherent noise to hide information within the digital image. Since wideband thermal noise, inherent to imagery of natural scenes captured by photoelectronic systems, can be modeled as additive white Gaussian noise (AWGN) this type of noise is included in the SSIS system. SSIS is able to mimic this inherent noise to hide the secret information within the digital image. In other types of coherent imaging, the noise can be modeled as speckle noise {17}, which is produced by coherent radiation from the microwave to visible regions of the spectrum. The concepts of SSIS can be extended to imagery with other noise characteristics than those modeled by AWGN. The additional noise which conceals the hidden message is a natural phenomenon of the image and therefore, if kept at typical levels, is not perceived by the casual observer or detectable by computer analysis.

Spread spectrum communication is the process of spreading the bandwidth of a narrowband signal across a wide band of frequencies. This can be accomplished by modulating the narrowband waveform with a wideband waveform, such as white noise. After spreading, the energy of the narrowband signal in any one frequency band is low and therefore difficult to detect. SSIS uses a variation of this technique to embed a message, typically a binary signal, within samples of a low power white Gaussian noise sequence consisting of real numbers. The resulting signal, perceived as noise, is then added to the cover image to produce the stegoimage. Since the power of the embedded signal is much lower compared to the power of the cover image, the SNR is also low, indicating low perceptibility and low probability of detection by an observer. Subsequently, if embedded signal power is much less than the power of an image, an observer should be unable to visually distinguish the original image from the stegoimage.

To construct the embedded signal the present invention incorporates the concept of a stored reference spread spectrum communications system {18}. The stored reference principle requires independent generation of identical pseudorandom wideband waveforms at both the transmitter and receiver. This can easily be accomplished by a private or public key {19} and identical pseudorandom waveform generators. In addition, the pseudorandom number generators can be cryptographically secure.

First, we describe a simple sign modulation scheme to provide an example of our spread spectrum process. This method is similar to the technique used in {20}. Assume that the message signal, m, is a bilevel signal consisting of $\{-1,+1\}$ and the spreading sequence, n, is a sequence of real numbers that have a normal distribution with zero mean and some variance, N. The two signals are modulated, or multiplied as in Equation (1), resulting in a sequence of real numbers. In this simple example, the sign of each noise sample is changed corresponding to the value of the message bit to be embedded. The white Gaussian characteristics of the signal are preserved. The decoding process is also elementary. The sequence n is replicated at the receiver, and the sign of this sequence is compared to the sign of the received embedded sequence, $\hat{s}$, to recover an estimated value of the message signal, $\hat{m}$, as shown in Equation (2).

$$s = m * n \qquad (1)$$

$$\hat{m} = \text{sign}\left(\frac{\hat{s}}{n}\right) \qquad (2)$$

Although this very simple system meets the necessary requirements of producing a Gaussian sequence regardless of the message signal values, a major deficiency lies within the detection of this signal in the presence of noise. This noise usually results from poor embedded signal estimation but also can be contributed to by the channel during transmission. Since only the variation of the sign of embedded signal samples indicates the message, a majority of the values occur in the vicinity of zero. Moreover, the distance between s when m=−1 and s when m=+1 is typically small, leading to the problematic detection of m.

Figure 4:
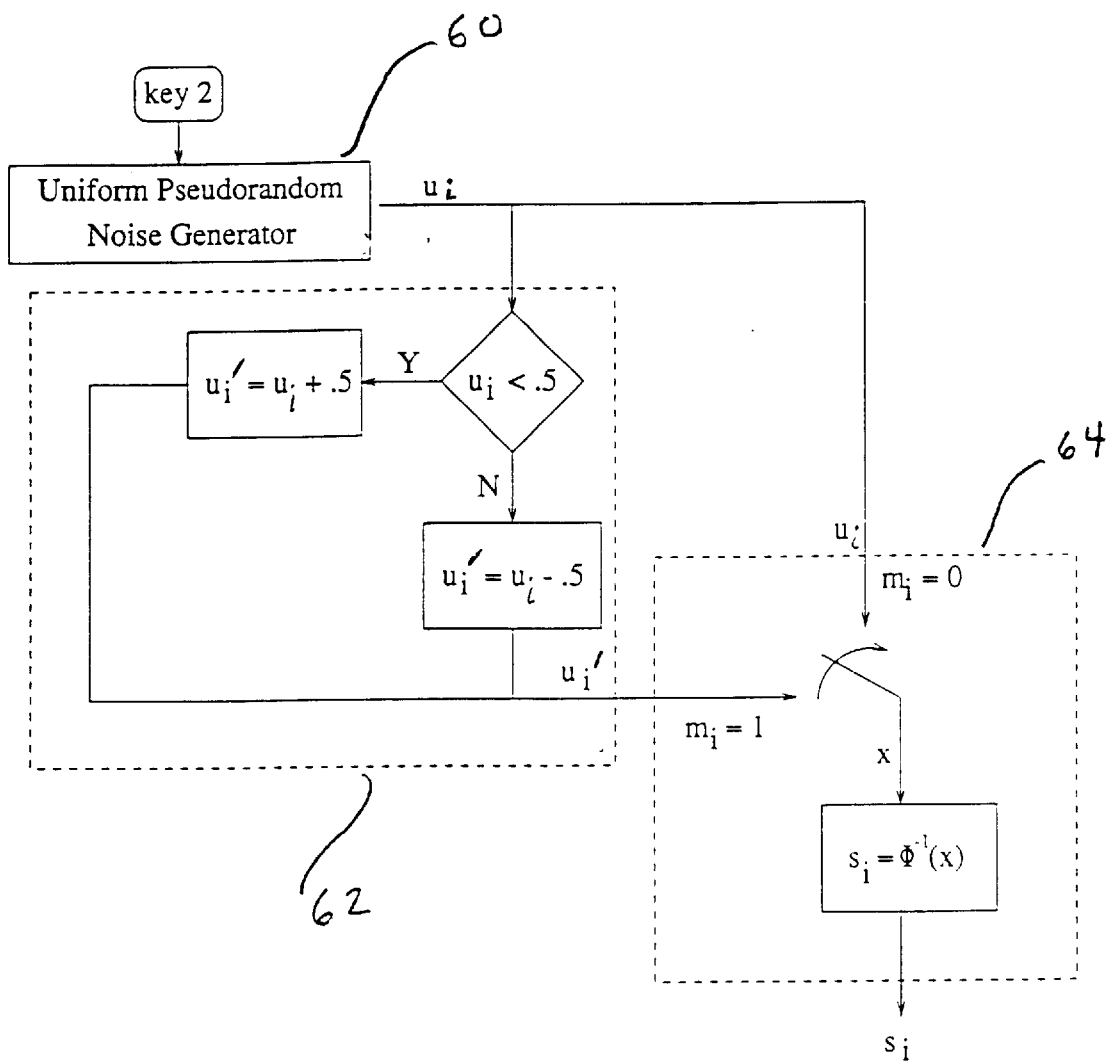
FIG. 4 shows a flow chart of the piece-wise linear modulation scheme of the present invention.

Therefore, in order to improve detection performance, a nonlinear modulation scheme was developed for SSIS. This modulation technique provides an increase in the minimum Euclidean distance between the possible modulated values, thereby enabling an improved estimate of the embedded signal over traditional sign modulation. A flow chart is shown in FIG. 4. This is accomplished by first generating a uniformly distributed random sequence u with uniform pseudorandom noise generator 60 using key 2. A second sequence, u', is generated by applying the piecewise linear transformation of Equation (3) to u with transformation procedure 62. The embedded signal, s, is then formed by selecting bits from these two sequences arbitrated by the message bits m, by switch arbitrator 64 as shown in Equation (4), where Φ represents the cumulative distribution function of a standard Gaussian random variable, Equation (5), where the inverse of Equation (5) is calculated using the methods presented in {21}. To adjust the power of the embedded signal a scale factor may be applied to the embedded signal s in order to further improve detection performance. This signal is then added to the cover image, the result after quantization is the stegoimage.

$$u' = \begin{cases} u + 0.5, & 0 \le u < 0.5 \\ u - 0.5, & 0.5 \le u \le 1.0 \end{cases} \qquad (3)$$

$$s = \begin{cases} \Phi^{-1}(u), & m = +1 \\ \Phi^{-1}(u'), & m = -1 \end{cases} \qquad (4)$$

$$\Phi(x) = \frac{1}{\sqrt{2\pi}} \int_{-\infty}^{x} e^{-\frac{y^2}{2}} dy \qquad (5)$$

Once obtained at the decoder, the estimate of the embedded signal, $\hat{s}$, is then compared with identical copies of the pseudorandom wideband waveforms, u and u', used at the encoder to produce an estimate of the hidden message $\hat{m}$. The generation of the identical pseudorandom wideband waveforms is accomplished by the possession of a common key 2 known only to the sender and receiver, that is used as a seed for duplicate random number generators. The method of key encryption may be chosen depending on the level of security desired.

At the decoder, the stegoimage is obtained and image processing techniques are used to estimate the embedded signal without knowledge of the original cover in order to avoid the need for a cover image escrow. By exercising image restoration techniques at restoration filter 40 an estimate of the embedded signal can be obtained by subtracting a version of the restored image $\hat{f}$ from the stegoimage $\hat{g}$, as shown in FIG. 3. Since the pixels of a digital image are highly correlated among neighboring pixels in natural scenes, filtering operations can be used to restore the stegoimage so that it resembles the original image.

The restored image $\hat{f}$ can be obtained with a variety of image processing filters, such as mean or median filters, or wavelet shrinkage techniques {22}, and adaptive Wiener filtering techniques {23}. However, the most favorable performance, determined by the quality of the recovered embedded signal, was obtained experimentally with alpha-trimmed mean filtering {27}.

Even though the image restoration yields good performance, the estimate of such a low power signal necessary to provide the degree of imperceptibility essential for a steganographic system, is still rather poor. Therefore, in order to compensate for the suboptimal performance of the signal estimation process, we have incorporated the use of error control coding. The probability of error encountered during the estimation process will be referred to as the embedded signal bit error rate (BER).

The use of error correcting coding by SSIS compensates for the suboptimal estimation of the embedded signal and combats distortion which may be encountered during the transmission process. The demodulated message signal may have a substantial number of bit errors, indicated by a high embedded signal BER. When a large number of errors are expected to occur in a block of data, an error-correcting code must be used to correct them. Error correcting codes within the SSIS system allow the hidden message to be recovered without error when the transmission channel is noiseless, thus compensating for the noise estimation process. When the transmission channel is expected to be noisy, the appropriate low rate error correcting code can be selected to provide desired performance.

Any error correcting code that has the capability to correct the signal estimation BER can be used within SSIS. For example, binary expansions of Reed-Solomon codes {25} were successfully implemented with the SSIS system of this application. These codes can correct many binary errors if a decoder is used that corrects bits instead of Reed-Solomon code symbols. The decoders described in {25} are based on a simple idea of Bossert and Hergert {26}: if we have a large number of low weight parity checks, then the number of failing parity checks tends to be proportional to the number of errors. Using this idea, we can change whichever bits reduce the number of failing parity checks until no checks fail. This algorithm works very well with binary expansions of low rate Reed-Solomon codes because they have a large number of low weight parity checks. With some other improvements described in {25}, these decoders can correct far more binary errors than conventional Reed-Solomon decoders for the same codes. For example, the (2040,32) decoder corrects most error patterns with fewer than 763 bit errors, while a conventional Reed-Solomon decoder would be limited to 125 symbol errors, which is typically about 165 bit errors. The rate of this (2040,32) code is similar to that of a (64,1) repetition code, but because it has a much longer block length, its decoded error rate drops much more quickly as the fraction of errors per block is reduced.

The SSIS system of the present has been implemented successfully on a standard UNIX computer. The source code of a preferred implementation is attached as Appendix A. In general, by increasing the SNR, the performance of embedded signal estimation is improved at the cost of some imperceptibility.

Figure 5:
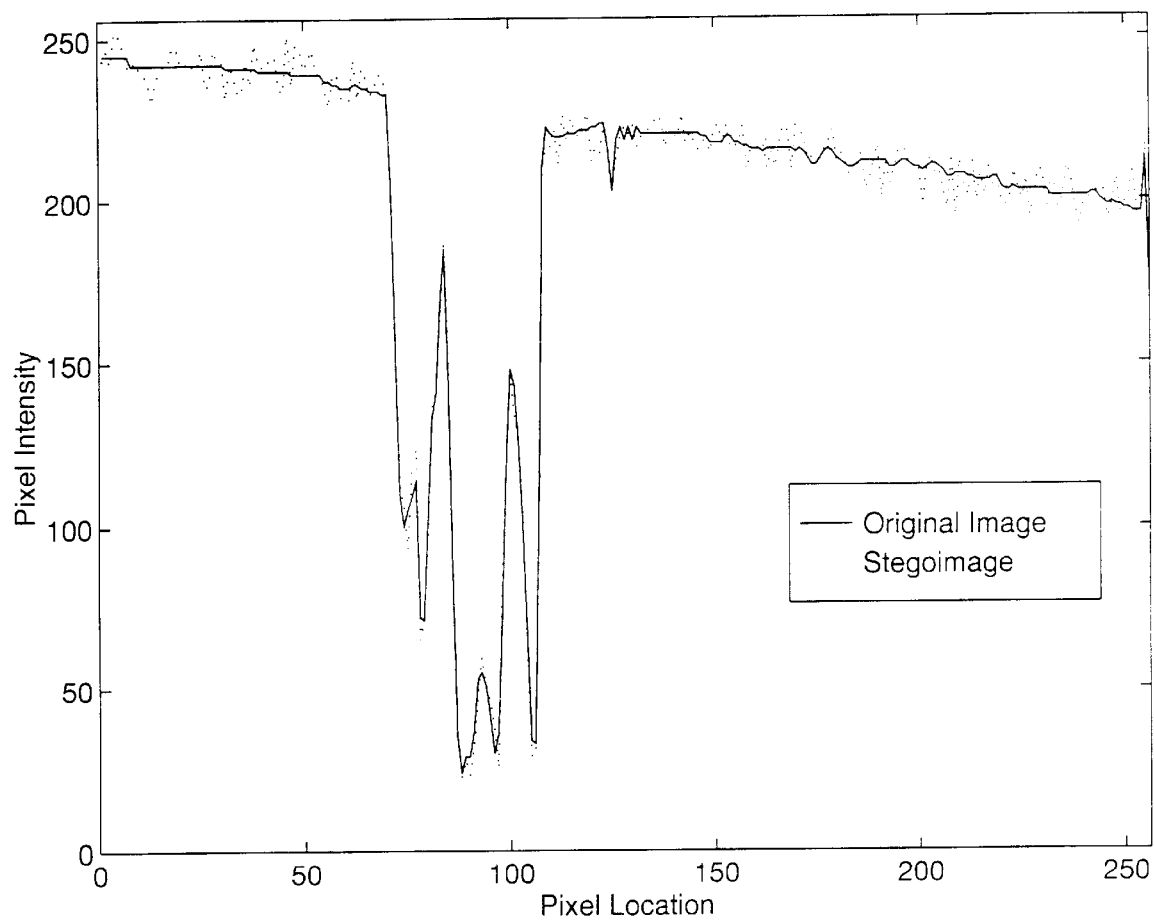
FIG. 5 shows a graph comparing the pixel intensity and location of an original cover image to the stegoimage.

In order to provide more insight into the presented methodology, a comparison between the original image pixels of a test image and the stegoimage pixels is presented in FIG. 5. Here a single row of pixels has been extracted from both an original 512×512 image of an LAV-25 military vehicle containing 256 kilobytes of data and the corresponding stegoimage embedded with high SNR. In this example the hidden message is a compressed ASCII file containing the 1783 Treaty of Paris which ended the American Revolutionary War. The steganographic SNR, the ratio of embedded signal power to cover image power, for the cover images is −35 dB. The embedded signal BER is 0.25, requiring the use of a ⅙ convolutional code {28} with soft-decision decoding with a Viterbi algorithm {29} and the use of side information obtained from the edges of the stegoimage. This coder can correct a block that is 27% in error. This yields a payload of 5.4 kilobytes of hidden information. Depending on the error correction method used, still higher payloads may be obtained. It is evident from the graph that slight discrepancies between the two exist. However these discrepancies are undetectable by human observer. Furthermore, without possession of the original image, the embedded signal is undetectable by statistical analysis by computer.

Additional protection can be provided for scenarios where additional errors are expected from the transmission process, such as those encountered in wireless environments or in lossy image compression, by using lower rate codes than those dictated by the signal estimation BER.

While the primary thrust of the invention of this application is directed to embedding of messages in digital images, the methods of the present invention could be used embed messages in virtually any kind of broadband digital signal such as high fidelity digital audio. The restoration filter would be designed to recover the particular information transmitted, such as digital audio. Other such modifications would be readily apparent to those of skill in the art.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be preferred embodiments of the present invention, it should be noted that the same have been made by way of illustration and not limitation. Accordingly, all modifications, alterations and changes coming within the spirit and scope of the present invention are herein meant to be included.

REFERENCES

{1} D. Kahn. *The Codebreakers—The story of—secret writing*. Scribner, New York, N.Y., 1967.

{2} B. Pfitzmann. Trials of traced traitors. In R. Anderson, editor, *Information Hiding, First International Workshop*. Lecture Notes in Computer Science, pages 49–64. Springer-Verlag, Berlin, 1996.

{3} C. Osborne R. van Schyndel, A. Tirkel. A digital watermark. *Proceedings of the IEEE International Conference on Image Processing*, 2:86–90, 1994.

{4} R. Machado. Stego. http://www.fqa.com/romana/romanasoft/stego.html.

{5} R. B. Wolfgang and E. J. Delp. A watermark for digital images. *Proceedings of the IEEE International Conference on Image Processing, Lausanne, Switzerland*, III:219–222, September 1996.

{6} E. Milbrandt. http://members.iquest.net/~mrmil/stego.html, October 1997. Steganography Info and Archive.

{7} T. Leighton, I. J. Cox, J. Kilian and T. Shamoon. Secure Spread Spectrum Watermarking for Images, Audio and Video. *Proceedings of the IEEE International Conference on Image Processing, Lausanne, Switzerland*, III:243–246, September 1996.

{8} C. I. Podilchuk and W. Zeng. Digital Image Watermarking Using Visual Models. In B. E. Rogowitz and T. N. Pappas, editors, *Human Vision and Electronic Imaging* 11, volume 3016, pages 100–111. SPIE, February 1997.

{9} B. Zhu, M. D. Swanson and A. H. Tewfik. Transparent Robust Image Watermarking. *Proceedings of the IEEE International Conference on Image Processing, Lausanne, Switzerland*, III:211–214, September 1996.

{10} N. Morimoto, W. Bender, D. Gruhl and A. Lu. Techniques for Data Hiding. *IBM Systems Journal*, 35(3 & 4), 1996.

{11} B. Zhu, M. D. Swanson and A. H. Tewfik. Robust Data Hiding for Images. *Proceedings of the IEEE Digital Signal Processing Workshop, Loen, Norway*, pages 37–40, September 1996.

{12} M. D. Swanson and A. H. Tewfik. Data Hiding for Multimedia Personalization, Interaction, and Protection. *IEEE Signal Processing Magazine*, 14(4):41–44, July 1997.

{13} Y. Nakamura K. Tanaka and K. Matsui. Embedding Secret Information into a Dithered Multi-level Image. *Proceedings of the IEEE Military Communications Conference, Monterey, Calif.*, pages 216–220, 1990.

{14} E. Adelson. Digital Signal Encoding and Decoding Apparatus. U.S. Pat. No. 4,939,515, 1990.

{15} G. B. Rhoads. Steganography Method Employing Embedded Calibration Data. U.S. Pat. No. 5,636,292, 1997.

{16} M. Cooperman. Steganographic Method and Device. U.S. Pat. No. 5,613,004, 1997.

{17} A. K. Jain. *Fundamentals of Digital Image Processing*. Prentice-Hall, Inc., Englewood Cliffs, N.J., 1989.

{18} R. A. Scholtz, M. K. Simon, J. K. Omura and B. K. Levitt. *Spread Sprectrum Communications*, Volume L Computer Science Press, Rockville, Md., 1985.

{19} B. Schneier. *Applied Cryptography—Protocols, Algorithms., and Source Code in C*. John Wiley and Sons, Inc., New York, N.Y., 1996.

{20} F. Hartung and B. Girod. Fast Public Key Watermarking of Compressed Video. *Proceedings of the IEEE International Conference on Image Processing*, Santa Barbara, Calif., October 1997.

{21} M. Abramowitz and I. A. Stegun. *Handbook of Mathematical Functions with Formulas, Graphs, and Mathematical Tables*. Dover Publications, Inc., New York, N.Y., 1964.

{22} D. L. Donoho. De-noising by Soft-thresholding. *IEEE Transactions on Information Theory*, 41(3):613–627, 1995.

{23} J. S. Lim. *Two-Dimensional Signal and Image Processing*. Prentice-Hall, Inc., Englewood Cliffs, N.J., 1990.

{24} J. S. Lee. Digital Image Enhancement and Noise Filtering by Use of Local Statistics. *IEEE Transactions on Pattern Analysis and Machine Intelligence*, 2:165–168, March 1980.

{25} C. T. Retter. Decoding Binary Expansions of Low-rate Reed-Solomon Codes Far Beyond the BCH Bound. *Proceedings of the 1995 IEEE International Symposium on Information Theory, Whistler, British Columbia*, page 276, September 1995.

{26} M. Bossert and F. Hergert. Hard- and Soft-decision Decoding Beyond the Half Minimum Distance—an Algorithm for Linear Codes. *IEEE Transactions on Information Theory*, 32(5):709–714, September 1986.

{27} J. Bee Bednar and Terry L. Watt. Alpha-Trimmed Means and Their Relationship to Median Filters. *IEEE Transactions on Acoustics, Speech and Signal Processing*, Vol. ASSP-32, No. 1, pp. 145–153, February, 1984.

{28} L. J. Harcke and G. E. Wood. Laboratory and Flight Performance of the Mars Pathfinder (15,1/6) Convolutionally Encoded Telemetry Link. *National Aeronautics and Space Administration* (*NASA*), NASA/JPL TDA Progress Report 42-129, NASA Code 624-04-00-MN-20, May, 1997.

{29} A. J. Viterbi, Error Bounds for Convolutional Codes and an Asymptotically Optimum Decoding Algorithm, *IEEE Transactions on Information Theory*, April, 1967, Vol. IT-13, No. 2, pp.260–269.

We claim:

1. A method of decoding steganographic messages embedded within digital signals comprising the following steps:

filtering the digital signal with a restoration filter to produce a restored digital signal;

subtracting the restored digital signal from the digital signal to produce a difference signal;

deinterleaving the difference signal;

replicating a pseudorandom spreading sequence;

demodulating the deinterleaved signal with the spreading sequence to construct an estimate of the message;

decoding the message with an error correcting code to produce a decoded message.

2. The method of claim 1, further comprising:

decrypting the decoded message with a key.

3. A method of decoding steganographic messages embedded within digital images comprising the following steps:

filtering the digital image with a restoration filter to produce a restored digital image;

subtracting the restored digital image from the digital image to produce a difference signal;

deinterleaving the difference signal according to a key;

replicating a pseudorandom spreading sequence according to a key;

demodulating the deinterleaved signal with the spreading sequence to construct an estimate of the message;

decoding the message with an error correcting code comprising a binary expansion of a Reed-Solomon code to produce a decoded message.

4. A method of steganography for concealing messages within digital signals comprising the steps of:

encoding an input message with an error correcting code to produce an encoded message;

generating a spreading sequence with a pseudorandom noise generator according to a key;

modulating the encoded message by the spreading sequence using a piecewise linear technique to produce an embedded signal; and combining the embedded signal with a cover signal to produce a stegosignal in which the input message is embedded.

5. The method of claim 4, further comprising encrypting the input message with a key.

6. The method of claim 4, further comprising interleaving the embedded signal to enhance recovery of the embedded signal.

7. The method of claim 6, where the step of interleaving the embedded signal is performed according to a key.

8. The method of claim 4, where the cover signal is a digital image.

9. The method of claim 4, where the error correcting code comprises a binary expansion of a Reed-Solomon code.

10. The method of claim 4, wherein the piecewise linear function comprises a sign function.

11. The method of claim 4, wherein the generation of the spreading sequence and piecewise linear modulation comprises:

generating a uniformly distributed random sequence, u;
generating a second sequence u' according to the following formula $$u' = \begin{cases} u+0.5, & 0 \leq u \leq 0.5 \\ u-0.5, & 0 \leq u \leq 0.5; \end{cases}$$

forming a spreading sequence by a switch arbitrator which selects from u and u' arbitrated by the input message.

12. A method of steganography for concealing messages within digital signals comprising the following steps:
   encrypting an input message with a key and encoding the input message with an error correcting code to produce an encoded message;
   generating a spreading sequence with a pseudorandom noise generator according to a key;
   modulating the encodeded message by the spreading sequence to produce an embedded signal and interleaving the embedded signal to enhance recovery of the embedded signal, where the interleaving step is performed according to a key;
   combining the embedded signal with a cover signal to produce a stegosignal in which the input message is embedded; and
   quantizing the stegosignal to preserve the original the original dynamic range of the cover signal.

13. A method of steganography for concealing messages within digital images comprising the following steps:
   encrypting an input message with a key;
   encoding the input message with an error correcting code comprising a binary expansion of a Reed-Solomon code to produce an encoded message;
   generating a spreading sequence with a pseudorandom noise generator according to a key;
   modulating the encoded message by the spreading sequence using a piecewise linear technique to produce an embedded signal;
   interleaving the spread spectrum modulated signal according to a key;
   combining the embedded signal with a cover image to produce spread spectrum modulated stegoimage in which the input message is embedded; and
   quantizing the interleaved spread spectrum modulated stegoimage to preserve the original dynamic range of the cover image.

14. The method of claim 13 wherein the piecewise linear function comprises a sign function.

15. The method of claim 13 wherein generation of the spreading sequence comprises
   generating a uniformly distributed random sequence, u;
   generating a second sequence u' according to the following formula $$u' = \begin{cases} u+0.5, & 0 \leq u \leq 0.5 \\ u-0.5, & 0 \leq u \leq 0.5 \end{cases}$$

forming a spreading sequence by a switch arbitrator which selects from u and u' arbitrated by the input message.

* * * * *